Dec. 4, 1934. J. L. ADAMS, JR 1,983,160
ELECTRIC WELDING APPARATUS
Filed March 10, 1932 5 Sheets-Sheet 1

INVENTOR
James L. Adams Jr.
his attys.

Dec. 4, 1934.   J. L. ADAMS, JR   1,983,160
ELECTRIC WELDING APPARATUS
Filed March 10, 1932   5 Sheets-Sheet 5

Patented Dec. 4, 1934

1,983,160

UNITED STATES PATENT OFFICE 1,983,160

ELECTRIC WELDING APPARATUS

James L. Adams, Jr., Youngstown, Ohio, assignor to The Youngstown Sheet and Tube Company, Youngstown, Ohio, a corporation of Ohio Application March 10, 1932, Serial No. 597,883

19 Claims. (Cl. 219—6)

The present invention relates broadly to the art of welding, and more particularly to that phase of the art dealing with the induction welding of substantially tubular objects such, for example, as pipes. It is to be understood, however, that the term "tubular" is used in its generic sense as including not only cylindrical objects but also objects of irregular or polygonal cross section.

In machine welding it is especially desirable to concentrate the welding current as much as possible in a defined or localized area. In induction welding where the current is induced into the material being welded by means of a primary magnetizing winding, this condition of concentration is harder to attain than in roller contact resistance welding wheren the current is conveyed into the object by means of moving contact electrodes. This is true because of the fact that it is necessary in an induction welding process to provide a coil with a certain amount of length and active surface area in order to induce the requisite amount of energy and current in the tubular object, whereas in roller contact resistance welding the necessary current is conveyed to the tubular object through practically a line contact from sources of substantially unlimited energy capacity. This type of contact leads to very high energy and current concentrations along the contact lines. The use of such contacts is, however, accompanied by a great many difficulties all of which are well recognized in the art, the difficulties increasing directly in proportion as the energy input increases.

To obtain as nearly as possible the desired welding current concentration in an induction welder, it is necessary that the inducing coil or coils be of relatively short length and at the same time so disposed with relation to the object being welded as to insure an effective induced current therein. In accordance with the present invention, I provide two juxtaposed short coils disposed radially one on either side of the tubular object being welded, and so connected electrically to the source of current that their energy induction effects on the tubular material as a secondary will be cumulative in such manner as to quickly bring the opposed edges of the material to a proper welding heat.

A further advantage in providing a short coil or coils resides in the fact that the distance between the main roll stands of the welder can be materially shortened, thus cutting down the length of the free ends of the tubular object which must otherwise be accurately guided between the roll stands. Cutting down this distance tends to assist in lowering the pipe end scrap losses and thereby contributes materially in correspondingly lowering the total cost.

While a single coil either inside or outside of the material may be utilized, the provision of juxtaposed radially spaced coils on opposite sides of the material, if such coils are of substantially the same ampere turn capacity, is extremely important in that the tendency of a single coil to throw out "spittings" may be substantially balanced out. This balancing out of the spittings ejection tendency of a single coil materially cuts down the lost time necessary for the periodic forcible removal of such spittings, and thereby materially increases the welder tonnage output by correspondingly lengthening the periods between cleaning shutdowns.

The shortened distance between roll stand center lines in an induction welder, while giving advantages of the character referred to with respect to the greater ease of guiding the edges between the stands, and the corresponding elimination of supplemental or special guiding means, is objectionable in that it makes repairs more difficult. In accordance with the present invention, this difficulty is obviated by providing means for quickly separating the housings for repair purposes. It is one of the objects of the present invention to provide a welder construction having means for accomplishing such a separation of the component parts thereof as to facilitate such repair and inspection as may be desired.

In the accompanying drawings I have shown for purposes of illustration only, and more or less diagrammatically, a preferred embodiment of the present invention, the invention being illustrated as applied generally to a welder of the character disclosed in my French Patent No. 715,039 of April 10, 1931. In the drawings—

Figure 1:
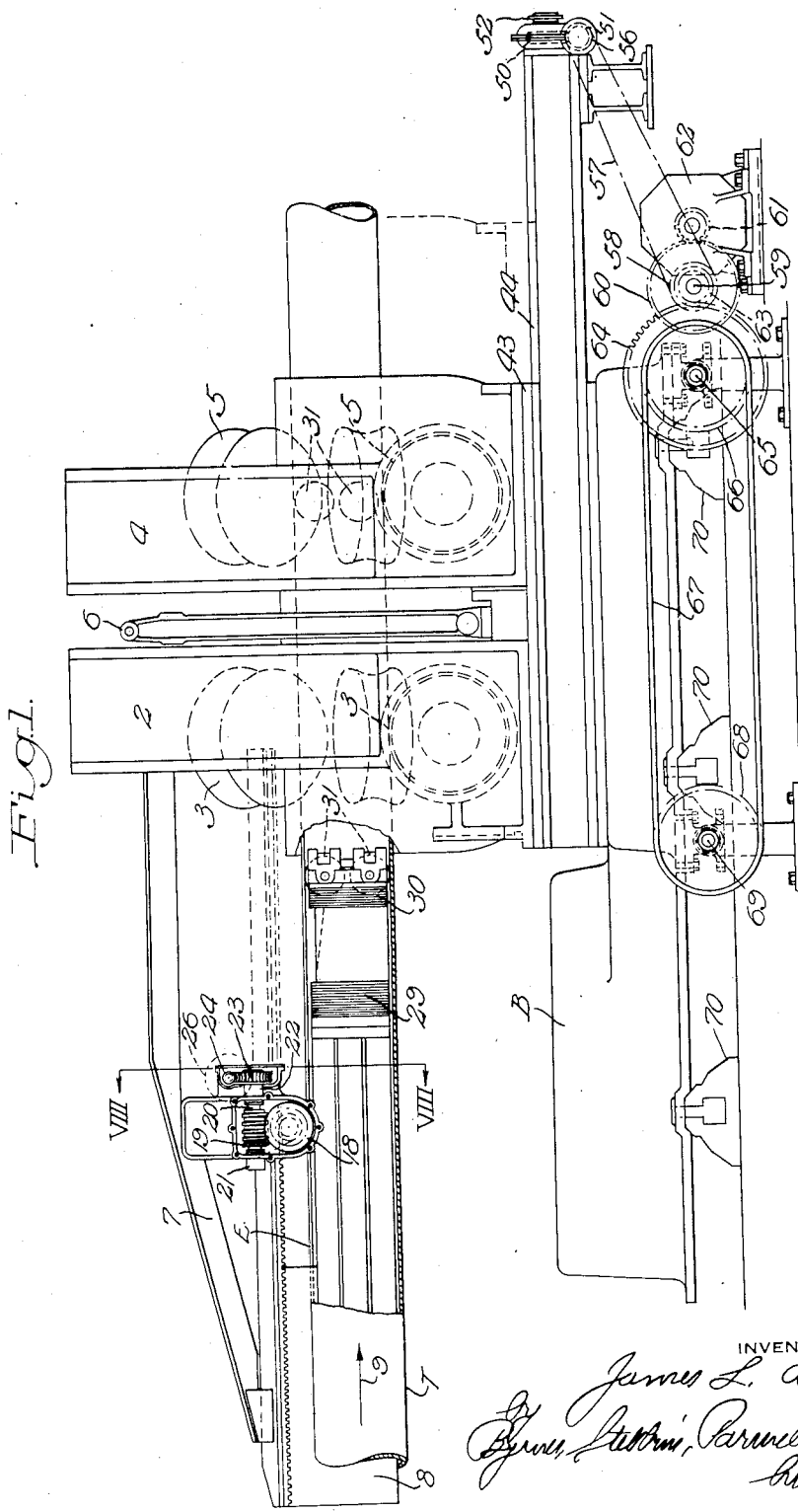
Figure 1 is a view partly in longitudinal section and partly in elevation, of a welder constructed in accordance with the present invention.

Referring generally to Figure 1 of the drawings, there is illustrated a welding apparatus comprising a stand 2 having a group of crushing and sizing rolls 3 therein. The crushing and sizing stand 2 is arranged in slightly spaced relationship to a welding stand 4 carrying a group of pressure rolls 5. Intermediate the stands 2 and 4 there may or may not be placed a regulating stand 6 for the purpose of more accurately controlling the tubular blank T during its travel through the apparatus.

Figure 5:
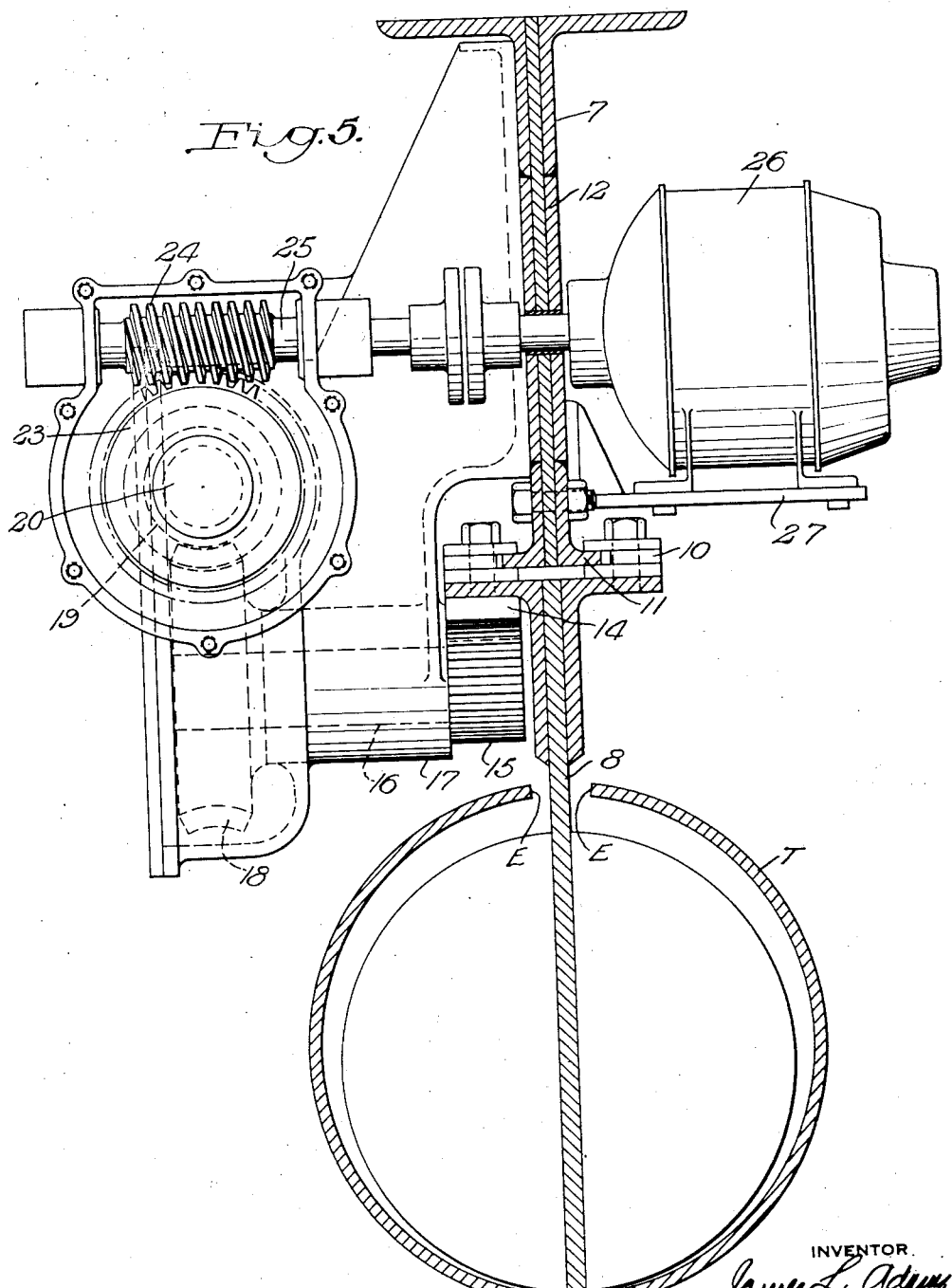
Figure 5 is a transverse sectional view along the line VIII—VIII of Figure 1, on an enlarged scale, looking in the direction of the arrows.

Carried by and projecting rearwardly from the housing 2 is an overhung framework 7 from which depends a web 8 adapted to extend through the opening between the edges E of the substantially tubular blank, as illustrated more particularly in Figure 5 of the drawings. In the operation of welding a tubular blank, the said blank is adapted to travel through the apparatus in the general direction indicated by the arrow 9 in Figure 1. During this travel it passes over the web 8 into the path of the crushing and sizing rolls 3, thence perhaps through the regulating stand 6 through the coil zone and on into the pass of the pressure applying rollers 5 in the welding stand 4. The pressure applying rollers 5 apply the necessary pressure to the tubular blank for bringing the edges thereof into welding engagement and thereby completing the weld.

Referring to Figure 5 of the drawings, it will be noted that the web 8 is carried by a slide 10 constructed to cooperate with the T-shaped head 11 of the beam portion 12 of the overhanging frame 7. Secured to the under side of the slide 10 is an inverted rack 14, the teeth of which are in engagement with a pinion 15 secured to a short shaft 16 journaled in a suitable bearing 17. To the opposite end of the shaft 16 is secured a worm wheel 18 with which meshes a worm 19 on a shaft 20. The worm shaft 20 is carried in suitable bearings 21 and 22 and has secured to one end thereof a worm wheel 23. This worm wheel is adapted to be driven by a worm 24 secured to a shaft 25 projecting through the beam 12 and driven by a motor 26 supported by a bracket 27 on the opposite side of the beam.

With the construction just described, it will be apparent that rotation of the motor will be effective for rotating the rack pinion 15 and thus progressing the rack 14 together with the web 8 in a predetermined direction. By making the motor 26 of the reversible type, the rack and web may be moved at the pleasure of the operator in either direction.

Secured to the forward end of the web 8 is a laminated core 28 terminating in pole pieces 29 and 30, the diameter of the pole pieces being such as to freely receive thereover the tubular blank T being welded. Beyond the pole pieces 30 the core has secured thereto internal pressure rolls 31, shown retracted to the left in Figure 1, but which may be advanced until they lie within the pass of the pressure rollers 5 but preferably slightly offset therefrom. The internal pressure or mandrel rolls 31 oppose the action of the pressure rolls 5 and at the same time serve as a supporting means for the free end of the core and web structure, maintaining the same in the desired relationship to the tubular blank.

The core 28 is provided with inner and outer inducing coils as disclosed in my U. S. Patent No. 1,941,526.

The particular construction of the coils constitutes no important part of the present invention other than that the arrangement illustrated permits the housings 2 and 4 to be placed in closely adjacent relationship in order to obtain the desired advantages before described.

This permissible arrangement of the housings in compact relation makes it highly desirable to have means for quickly separating the roll stands. The use of inside and outside inducing coils permits the very closest possible spacing of successive stands, which further emphasizes the desirability of means for effecting rapid movement of the stands relative one to another.

Figure 3:
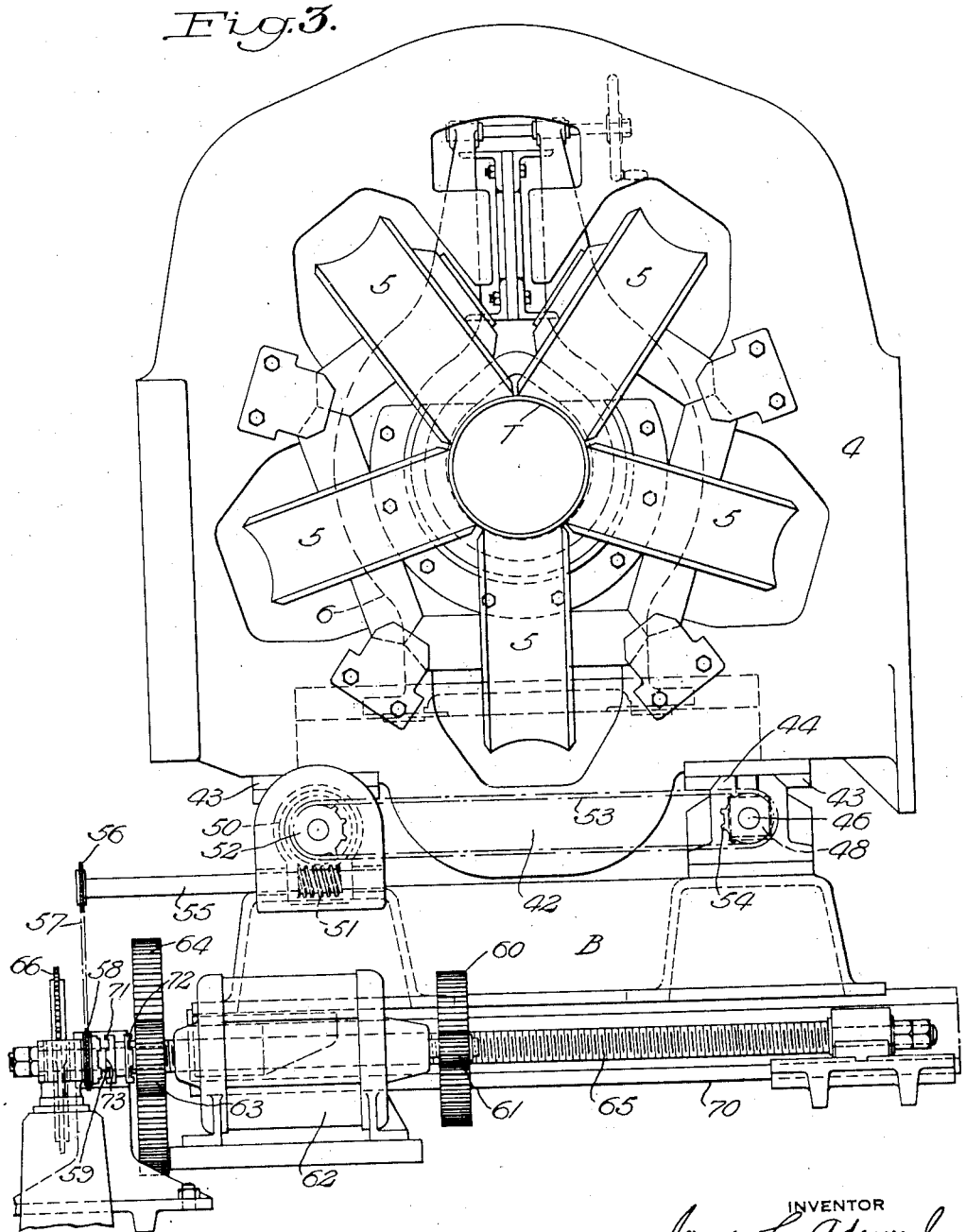
Figure 3 is an end elevational view of the construction illustrated in Figure 2.
Figure 4:
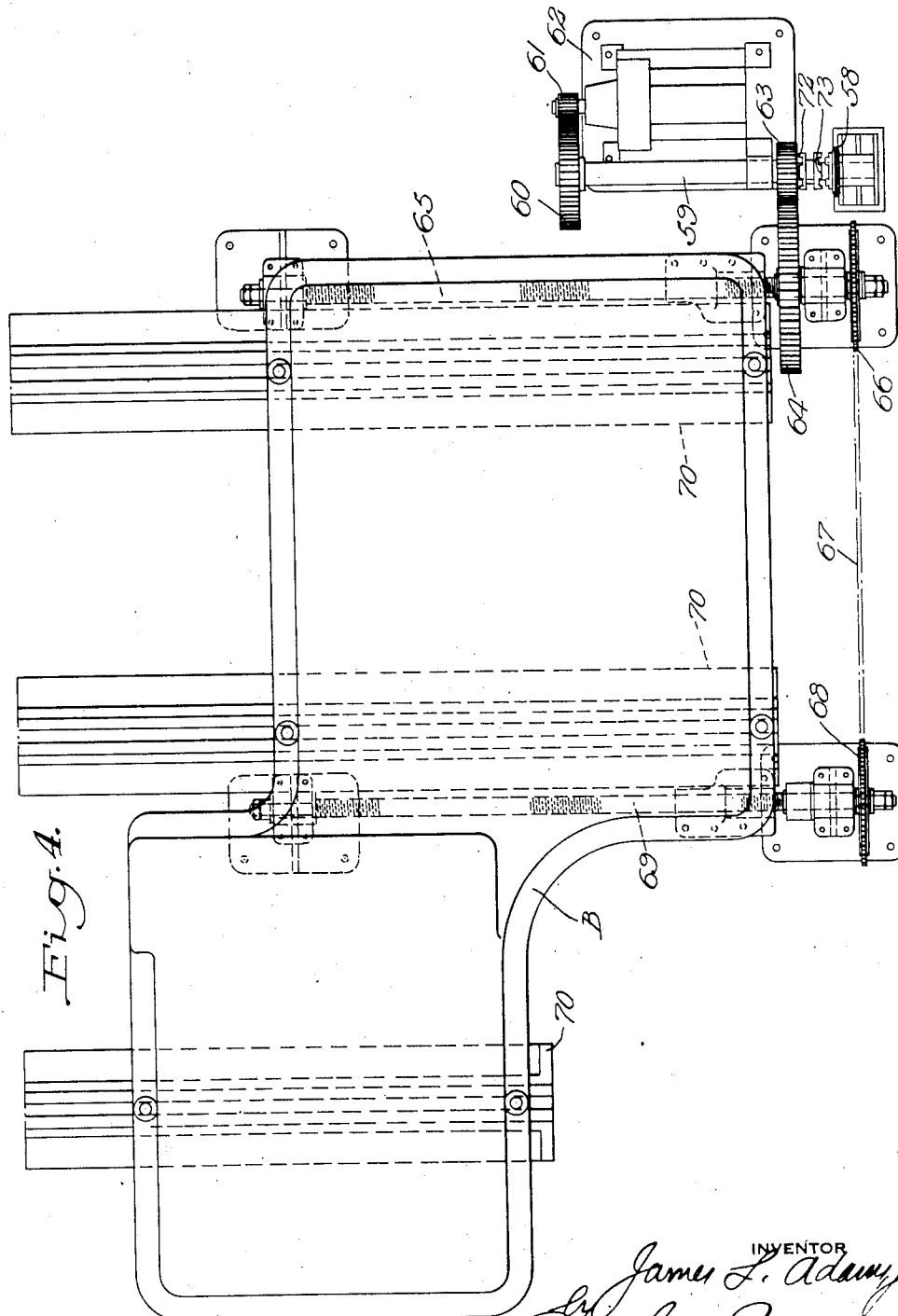
Figure 4 is a top plan view of the welding machine base, illustrating the location of the means for effecting transverse adjustment thereof.

In order to provide a low reluctance return path for the magnetic flux outside of the blank secondary, there may be provided laminated steel yokes 41 which more or less completely surround the entire circumference of the blank and coils except at the top portion thereof, as shown, for example, in Figure 3 of the drawings. The plane of these laminations may be made radial, if preferred.

The closely adjacent relationship of the stands 2 and 4 as preferred for the actual welding, makes it necessary to provide means for quickly and easily separating these stands at such times as repairs or adjustments may be required. To accomplish such a separation, the construction may conveniently be of the type illustrated more particularly in Figures 2 and 3 of the drawings. In these figures the base 42 of the welding stand 4 is illustrated as being provided with shoes 43 adapted to slidingly engage longitudinally extending rails 44 on opposite sides of the longitudinal center line of the housing and symmetrically disposed with respect thereto. While the base of the regulating stand 6 is not shown, it is of generally similar construction, and may be similarly adapted for sliding movement along the rails 44, if so desired.

Figure 2:
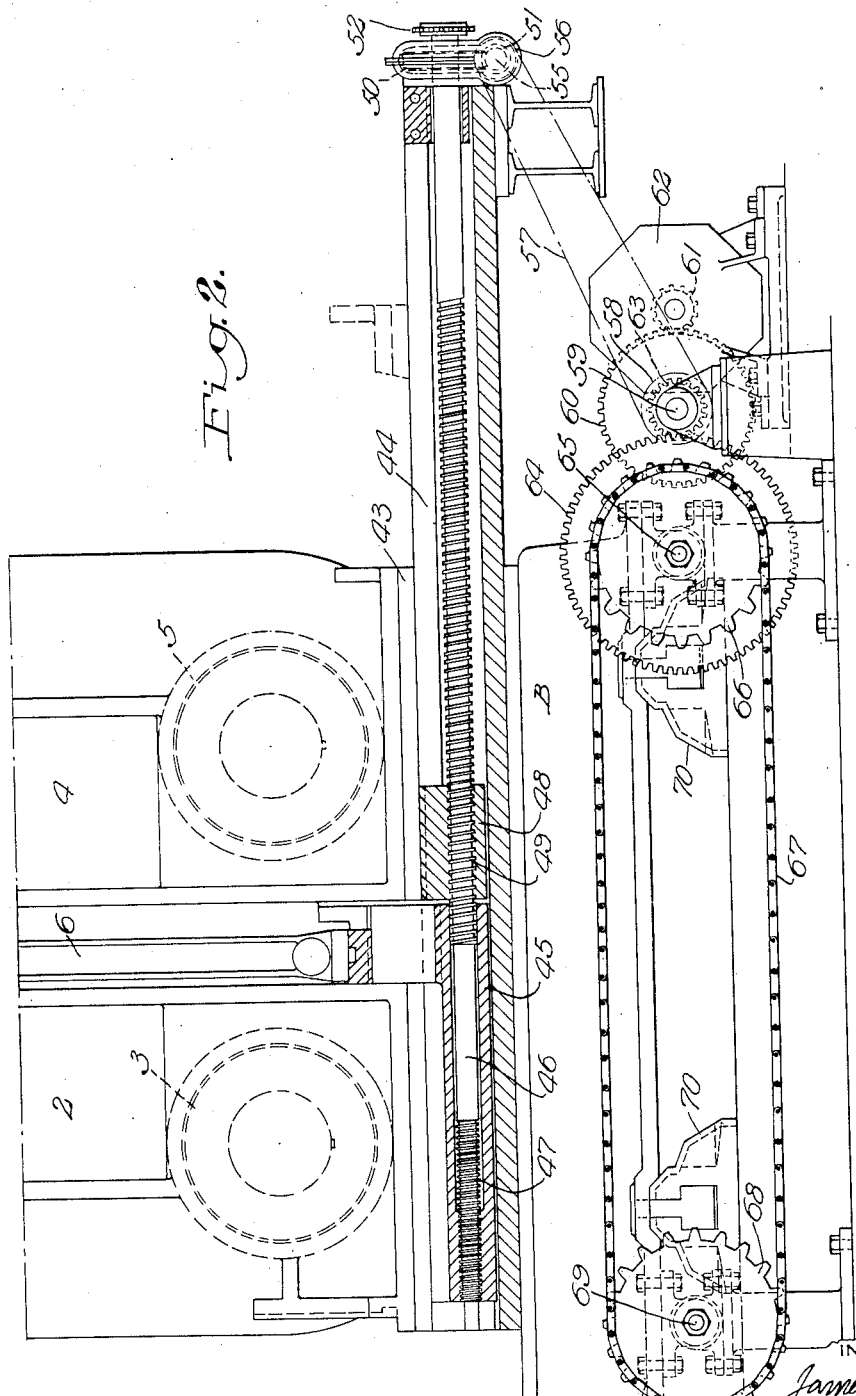
Figure 2 is a view partly in section and partly in elevation, illustrating more particularly the means for adjusting the housings.

As illustrated in Figure 2, the base of the regulating stand 6 is provided with a nut 45 which extends backwardly under the base of the housing 2. Threaded into the nut 45 is one end of a screw 46, a similar screw and nut being provided for the opposite side of the apparatus, as will be apparent from Figure 3. The threads 47 which cooperate with the nut 45 preferably have a relatively low pitch for reasons hereinafter described.

Secured to the base 42 of the housing 4 on opposite sides of the longitudinal center line are nuts 48 which cooperate with threaded portions 49 on the screws 46. The threaded portions 49 preferably have a materially greater pitch than the pitch of the threads 47. If it be assumed, by way of example, that the pitch of the threads 49 is twice that of the pitch of the threads 47, it will be apparent that if the screws 46 are rotated in a predetermined direction, the stand 4 and the stand 6 will be simultaneously moved to the right, the stand 4 moving at twice the speed of the stand 6. This will result not only in a separation between the stands 2 and 4, but also in a separation between the stands 2 and 6 and the stands 6 and 4, whereby access to the parts of the welding apparatus may be easily had.

For obtaining the desired rotation of the screws 46, one of the screws has secured thereto a worm wheel 50 meshing with a worm 51. The screw 46 carrying the worm wheel 50 may likewise be provided with a sprocket 52 for driving a sprocket chain 53 cooperating with a sprocket 54 on the other screw, whereby the two screws will be at all times rotated synchronously. For rotating the worm 51, its shaft 55 is provided with a sprocket 56 operatively connected by a sprocket chain 57 to a sprocket 58 on a jack shaft 59. This jack shaft also carries a gear 60 meshing with a pinion 61 on the armature shaft of a stand moving motor 62.

Also carried by the jack shaft 59 is a pinion 63 meshing with a gear 64 on the end portion of a screw shaft 65 generally similar to the screws 46 but provided with a single threaded portion only. This screw carries a sprocket 66 connected by a sprocket chain 67 to a second sprocket 68 on screw shaft 69 corresponding to the screw shaft 65, whereby these two screw shafts may also be rotated in unison and in the same direction. Upon such rotation in one direction, the main base B which carries the stands 2, 4 and 6 will be slid transversely on the shoes 70.

At times it may be desired to effect longitudinal separation without transverse adjustment, while at other times it may be desired to effect transverse adjustment without longitudinal separation. In order that this operation may be accomplished, the jack shaft 59 is provided with a shiftable clutch 71 having teeth 72 adapted to mesh with similar teeth on the pinion 63, and with teeth 73 adapted to mesh with corresponding teeth on the sprocket 58. Thus when the clutch is moved to neutral position, the clutch being keyed only to the jack shaft 59, neither the sprocket 58 nor the pinion 63 will be rotated. By shifting the clutch in one direction or the other, either of these parts may be rotated at will. By making the motor 62 of the reversible type, the movement of the stands may be effected at will in either direction.

From the foregoing description, it will be apparent that I have provided an improved welding apparatus characterized by the provision of operating stands located in closely adjacent relationship, but capable of being easily and quickly separated in a direction axially of the material being welded, or moved in a direction transversely to the axis of such material. These movements, together with the mechanisms by which they may be obtained, constitute an important advantage of the present invention.

The invention is further characterized by a movably supported core of such construction as to permit the free movement thereover of the tubular blank being operated upon, such core structure being capable of being moved in a direction axially for advancing or retracting the same with respect to the operating stands, or for moving the same entirely outside of the zone of such stands to permit repairs or substitutions to be made thereon at will, as shown in Figure 1.

The entire construction is characterized by closely adjacent roll housing parts effective for preventing radial weaving or mis-alinement of the edge portions being welded, and with a maximum concentration of the current input per foot length of the tube, yet with all of the parts readily accessible should such accessibility be necessary.

The particular form and arrangement of coils herein illustrated and described is made the subject matter of my co-pending application Serial No. 604,518, filed April 11, 1932, now issued as Patent No. 1,941,526.

While I have herein illustrated and described a preferred embodiment of the invention, it will be understood that changes in the construction and operation of the parts may be made without departing either from the spirit of the invention or the scope of my broader claims.

I claim:

1. In a welding apparatus, a plurality of stands positioned in axial alinement for the passage therethrough of material to be welded, and means for differentially separating said stands in a direction axially thereof, said means including a screw having a threaded engagement of different pitch with certain of said stands.

2. In a welding apparatus, a crushing roll stand, a welding roll stand, a flash regulating stand intermediate said first mentioned stands, and means for differentially moving said flash regulating stand and welding stand relative to said crushing stand, said means including a screw connection having threads of different pitch cooperating respectively with the regulating stand and welding stand.

3. In an electric welding apparatus, an inside coil and core structure, means for supporting said coil and core structure within a substantially tubular blank including a guide and a carriage movable therealong, said coil and core structure being provided with a rolling support engaging with a portion of the blank, and means for bodily moving said structure in a direction axially of the blank, including a drive for said carriage.

4. In a welding apparatus, a pair of roll stands, one of which constitutes a welding stand, a coil and core structure including a supporting carriage, a guide on which said carriage travels, said guide being in axial alinement with said stands, and drive mechanism effective for moving said carriage along said guide.

5. In a welding apparatus, a pair of roll stands one of which constitutes a welding stand, a coil and core structure, means for supporting said coil and core structure in operative position intermediate said stands to permit the passage thereover of substantially tubular material to be welded, said means including a guide and a carriage movable therealong, and means for moving said structure bodily out of position between said stands, including a drive for said carriage.

6. In a welding apparatus, a roll stand, a support projecting laterally from said stand, a carriage movable on said support, a coil and core structure mounted on said carriage in substantially axial alinement with the pass through said stand, and means for moving said coil and core structure axially through said pass, including a drive for said carriage.

7. In a welding apparatus, a plurality of stands positioned in axial alinement for the passage therethrough of material to be welded, and means for differentially separating said stands in a direction axially thereof, including a common adjusting screw having successive portions differently threaded.

8. In a welding apparatus, an entering roll stand, a welding roll stand, a flash regulating stand intermediate said first mentioned stands, and means for differentially moving said flash regulating stand and welding stand relative to said entering stand, including a screw having a threaded engagement of different pitch with certain of said stands.

9. In a welding apparatus, a plurality of roll stands, means for moving certain of said stands longitudinally one with respect to the other, means for effecting lateral movement of said stands, a common drive for said two last mentioned means, and a clutch for connecting said drive to one of said means selectively.

10. In a welding apparatus, a plurality of closely adjacent roll stands, a coil structure intermediate said stands, and means for moving said stands to facilitate access to said coil structure, including an adjusting screw having portions provided with threads of different pitch, said portions engaging said stands, respectively.

11. In a welding apparatus, a plurality of roll stands, an adjusting screw engaging said stands, said screw having portions with threads of different pitch, engaging said stands, respectively, adjusting screws for shifting said stands transversely, a motor for driving said first mentioned screw or said transverse adjusting screws, and a clutch for connecting said motor to said first mentioned screw and transverse adjusting screws selectively.

12. In an electric welding apparatus, a primary inducing coil located in close operative proximity to an open seam in metal being welded, a laminated magnetic core within said coil, means for mounting said coil and core in operative relation to the metal being welded, and means for retracting said coil and core from normal welding position, including a carriage, a guide movably supporting the carriage, and a drive for reciprocating the carriage.

13. In an electric induction welder, substantially equi-powered inducing coils located in substantially opposed relationship to each other on opposite sides of a metal plate being welded, and connected cumulatively to assist each other in inducing a single cross seam current flow between slightly spaced elements in said metal, and rapid traverse means including a carriage movable along a guide, and a drive for the carriage, for moving one of said coils relative to the other.

14. In an electric induction welder, substantially equi-powered inducing coils having such a current flow therethrough as cumulatively to assist each other in inducing a single cross seam current between slightly spaced elements in a moving metal secondary, said coils being located in substantially opposed positions on opposite sides of such secondary, a carriage supporting one of said coils, a guide along which the carriage travels, and rapid traverse means for moving said carriage.

15. In an electric welding apparatus, an inner coil and core structure, means including a movable carriage supporting said structure to permit the movement thereover of substantially tubular material to be welded, a guide along which the carriage travels, roller means causing the progressive longitudinal motion of said material, and means for shifting said carriage in a direction axially of such material to a point beyond said roller means whereby quick accessibility to said coil is attainable.

16. In an electric induction welding apparatus, a plurality of closely adjacent and axially alined roll stands, a coil and core structure substantially coaxially mounted intermediate said roll stands, axially directed supporting guideways for said coil and core structure and at least one of said roll stands, and means effective to move said latter roll stand and said coil and core structure axially on said guideways with respect to the remaining roll stands and to each other.

17. In a welding apparatus, a plurality of axially alined roll stands, a common axial adjusting screw extending through successive threaded elements of different pitches in at least two of said stands, axial guideways supporting the movable roll stands, transverse guideways supporting said axial guideways, and a drive selectively applicable to cause axial and transverse roll stand motions respectively.

18. In a progressive electric induction welder, an inner coil and core structure, a carriage movable axially of and supporting said coil and core structure, a guideway supporting said carriage and coil and maintaining the latter in inductive relation within a movable formed-up tube blank, roller means to propel said tube blank longitudinally and progressively, and means engaging said carriage to retract said coil toward a position completely outside of the limits of said roller means.

19. In a progressive electric induction welder, a plurality of roll stands mounted in axial alinement, an inducing coil and core structure mounted substantially coaxially therewith, at least one of said roll stands including work-progressing means which guides the material in inductive relation to said coil and core structure, guideways supporting said coil and core structure and at least one of said roll stands, means engaging said coil and core structure and the latter roll stand and operable to traverse the same separately away from the normal welding position as required.

JAMES L. ADAMS, Jr.